(12) United States Patent
O'Reilly et al.

(10) Patent No.: US 10,942,911 B2
(45) Date of Patent: Mar. 9, 2021

(54) AGGREGATING HIGH VOLUMES OF TEMPORAL DATA FROM MULTIPLE OVERLAPPING SOURCES

(71) Applicant: D&B BUSINESS INFORMATION SOLUTIONS, Dublin (IE)

(72) Inventors: Conor O'Reilly, Dublin (IE); Telmo Inacio de Sousa Felix, Dublin (IE); Cian Craddock, Dublin (IE)

(73) Assignee: D&B BUSINESS INFORMATION SOLUTIONS, Dublin (IE)

( * ) Notice: Subject to any disclaimer, the term of this patent is extended or adjusted under 35 U.S.C. 154(b) by 620 days.

(21) Appl. No.: 15/073,369

(22) Filed: Mar. 17, 2016

(65) Prior Publication Data

US 2016/0275130 A1   Sep. 22, 2016

Related U.S. Application Data

(60) Provisional application No. 62/135,982, filed on Mar. 20, 2015.

(51) Int. Cl.
*G06F 16/23*       (2019.01)
*G06F 16/21*       (2019.01)

(52) U.S. Cl.
CPC ........ *G06F 16/2358* (2019.01); *G06F 16/219* (2019.01); *G06F 16/23* (2019.01)

(58) Field of Classification Search
CPC .. G06F 16/2379; G06F 16/2358; G06F 16/23; G06F 16/219; G06F 16/27
See application file for complete search history.

(56) References Cited

U.S. PATENT DOCUMENTS 5,802,322 A * 9/1998 Niblett ............... H04L 12/1822
                                                                709/219
5,826,253 A * 10/1998 Bredenberg ........ G06F 12/0815
(Continued)

FOREIGN PATENT DOCUMENTS

CN          101127034       2/2008
KR          10-0786261      12/2007

OTHER PUBLICATIONS

Zhang et al., Efficient computation of temporal aggregates with range predicates, PODS '01: Proceedings of the twentieth ACM SIGMOD-SIGACT-SIGART symposium on Principles of database systemsMay 2001 pp. 237-245 (Year: 2001).*

(Continued)

*Primary Examiner* — Cheyne D Ly
(74) *Attorney, Agent, or Firm* — Ohlandt, Greeley, Ruggiero & Perle, L.L.P.

(57) ABSTRACT

There is provided a technique that includes (1) receiving a data element, (2) comparing the data element to a corresponding data element in a pend update history repository that contains changes that have occurred to the data element over time, thus yielding a comparison, (3) determining, based on the comparison, that the data element has changed, (4) checking that there is no update process running that might contain more up-to-date data for the data element, (5) relating the data element to a cutoff number that is associated with a particular range of time, and (6) updating corresponding data elements in (a) a full universe data repository that stores a current value for the data element and a previous value for the data element, and (b) a delta data repository that stores a record that indicates (i) that the data element is being updated, and (ii) the cutoff number.

12 Claims, 11 Drawing Sheets

(56) References Cited

U.S. PATENT DOCUMENTS

| | | | |
|---|---|---|---|
| 6,389,429 B1* | 5/2002 | Kane | G06Q 10/06393 |
| | | | 707/609 |
| 8,656,270 B2 | 2/2014 | Rui et al. | |
| 2004/0230571 A1* | 11/2004 | Robertson | G06F 16/22 |
| 2005/0262076 A1* | 11/2005 | Voskuil | G06F 8/65 |
| 2010/0235335 A1* | 9/2010 | Heman | G06F 17/30345 |
| | | | 707/703 |
| 2011/0264636 A1 | 10/2011 | Chowdhary et al. | |
| 2012/0089580 A1 | 4/2012 | Yamashita et al. | |
| 2013/0132335 A1 | 5/2013 | Yang et al. | |
| 2013/0166522 A1* | 6/2013 | Kaufmann | G06F 16/2477 |
| | | | 707/695 |
| 2014/0280065 A1 | 9/2014 | Cronin et al. | |

OTHER PUBLICATIONS

International Search Report dated Jul. 5, 2016 from corresponding PCT/IB2016/000413, pp. 6.
International Written Opinion dated Jul. 5, 2016 from corresponding PCT/IB2016/000413, pp. 9.
Nayem Rahman, Temporal Data Update Methodologies for Data Warehousing, Journal of the Southern Association for Information Systems,vol. 2, No. 1, Jun. 1, 2014 (Jun. 1, 2014), p. 1-p. 11.
Alberto Abello et al, The Data Warehouse: an Object-Oriented Temporal Database, VIII Jornadas Ingenieria Del Software Y Bases De Datos (JISBD 2003), Nov. 12-14, 2003, Alicante, Nov. 1, 2003 (Nov. 1, 2003), pp. 675-684, XP055282118, the whole document.
Chinese Office Action dated Mar. 3, 2020 in corresponding Chinese Patent Application No. 201680023236.4, 11 pages.
Indian Office Action dated Oct. 28, 2020 in corresponding Indian Patent Application No. 201747033408, 7 pages.

\* cited by examiner

Example Field-Element File Data

```
duns                                  : 001001184
nonce                                 : î'…ääš"
uuid                                  : Hff52e3b5-7453-4738-ac1f-5e520792c4df
timestamp                             : 2015-02-05T13:41:06Z
ConsolidatedTotalEmployeeQuantity     : 2       (source: atlasseed, 001001184@íäûæš"Hff52e3b5-7453-4738-ac1f-5e520792c4df$2015-02-05T13:41:06Z)
ControlOwnershipDate                  : 1996    (source: atlasseed, 001001184°¥ãäæš"Hff52e3b5-7453-4738-ac1f-5e520792c4df$2015-02-05T13:41:06Z)
DUDUNSNumber                          : 000000000 (source: atlasseed,001001184ö‡™ûæš"Hff52e3b5-7453-4738-ac1f-5e520792c4df$2015-02-05T13:41:06Z)
FacsimileInternationalDialingCode     : 1
ForbesLargestPrivateIndicator         : SPECIMEN (source: mock, 001001184°¥ãäæš"Hff52e3b5-7453-4738-ac1f-5e520792c4df$2015-02-05T13:41:06Z)
Fortune1000Indicator                  : SPECIMEN
GUDUNSNumber                          : 000000000
ICode                                 : 100
                                      : 1        (source:atlasseed,description:IC Description,codeValue:1234,typeText4D&B:Standard Industry Code)
   typeSequence                       : 2
IndividuaTotalEmployeeQuantity        : 968300060
MailingPostalCode                     : Honolulu
MailingPrimaryTownName                : P.O. BOX 8060
MailingStreetAddressLine1             : HI
MailingTerritoryAbbreviatedName       : Hawaii
MailingTerritoryofficialName          : Toyokazu Nakayama
MostSeniorPrincipalFullName           : President
MostSeniorPrincipalJobTitle           : US
PrimaryCountryISOAlpha2Name           : United States
PrimaryCountryofficialName            : Trillion Corporation
PrimaryOrganizationName               : 96830
PrimaryPostalCode                     : Honolulu
PrimaryPrimaryTownName                : false
PrimaryRegisteredAddressIndicator     : 4724
PrimarySicCode                        : HI
PrimaryTerritoryAbbreviatedName       : Hawaii
PrimaryTerritoryName                  : SPECIMEN (source: mock, 001001184ö£ûæš"Hff52e3b5-7453-4738-ac1f-5e520792c4df$2015-02-05T13:41:06Z)
StockTickerName                       : 8089266252
TelecommunicationNumber               : 1
TelephoneInternationalDialingCode
```

FIG. 1A

Table 190
Example Cutoff Log

| Cutoff Number | Update Range Start | Update Range End |
|---|---|---|
| 3 | 2015-03-09_01:00:00 | 2015-03-09_23:59:00 |
| 4 | 2015-03-10_01:00:00 | 2015-03-10_23:59:00 |
| 5 | 2015-03-11_01:00:00 | 2015-03-11_23:59:00 |
| 6 | 2015-03-12_01:00:00 | 2015-03-12_23:59:00 |

FIG. 1B

Table 290
Example Transformation Rules

| Canonical Mapping | Fields | Mapping | Rule (if applicable) |
|---|---|---|---|
| IndustryCode[D&BIndustryCode][1] | GBWR_US_1987_SICS1 | element.value | |
| IndustryCode[D&BIndustryCode][1] | GBWR_US_1987_SICS1_DNB_IND_TYPE_CODE_NORMALIZED | element.attrs["DNBCodeValueType"] | |
| IndustryCode[D&BIndustryCode][1] | GBWR_US_1987_SICS1_DNB_IND_TYPE_TEXT_NORMALIZED | element.attrs["TypeText"] | |
| IndustryCode[D&BIndustryCode][1] | GBWR_US_1987_SICS1_DNB_IND_CODE_DESC_NORMALIZED | element.attrs["DNBCodeDescription"] | |
| IndustryCode[D&BIndustryCode][1] | "EDGED&BSTANDARD" | element.attrs["tag"] | |
| HQDUNSNumber | HQPAR_DUNS | element.value | IF HQPAR_DUNS IS NOT NULL and GBWR_SUBSID_IND = 0 then populate with HQPAR_DUNS |
| HQDUNSNumber | GBWR_SUBSID_IND | condition | |
| ParentDUNSNumber | HQPAR_DUNS | element.value | IF HQPAR_DUNS IS NOT NULL and GBWR_SUBSID_IND = 3 then populate with HQPAR_DUNS |
| ParentDUNSNumber | GBWR_SUBSID_IND | condition | |
| HQCountryOfficialName | GBWR_HQPAR_COUNTRY_NAME_NORMALIZED | element.value | IF HQPAR_DUNS IS NOT NULL and GBWR_SUBSID_IND = 0 then populate with GBWR_HQPAR_COUNTRY_NAME_NORMALIZED |
| HQCountryOfficialName | GBWR_SUBSID_IND | condition | |

FIG. 2A

Table 390
Example of State Machine Logic

| Group | Current State | Source in | Best Quality Rule |
|---|---|---|---|
| A | Element value from source:S1 (145a) | S1.in | S1.in.Date > element value source date THEN update |
| A | Element value from source:S1 (145a) | S2.in | S2.in disregard as S1 source always best quality |
| A | Element value from source:S1 (145a) | S3.in | S3.in.Date > element value source date THEN update (as local market) |
| B | Element value from source:S2 (145b) | S1.in | S1.in.Date > element value source date THEN update |
| B | Element value from source:S2 (145b) | S2.in | S2.in.Date > element value source date THEN update |
| B | Element value from source:S2 (145b) | S3.in | S3.in.Date > element value source date THEN update (as local market) |
| C | Element value from source:S3 (145c) | S1.in | S1.in disregard as S3.source always best quality as local market |
| C | Element value from source:S3 (145c) | S2.in | S2.in disregard as S3.source always best quality as local market |
| C | Element value from source:S3 (145c) | S3.in | S3.in.Date > element value source date THEN update |

FIG. 3A

Table 395
Example of Updated Data

| Update | Example Data |
|---|---|
| 1st update | e:StreetAddressLine1<br>value={"value": "560 BROADWAY RM 510", "attrs": {"timestamp": "2015-01-06T134454Z", "source": "worldbase4370", "cutoff": "7"}} |
| 2nd update | e:StreetAddressLine1<br>value={"value": "560 BROADWAY RM 530", "attrs": {"timestamp": "2015-01-13T115914Z", "source": "worldbase4370", "cutoff":"9"}} |

FIG. 3B

AGGREGATING HIGH VOLUMES OF TEMPORAL DATA FROM MULTIPLE OVERLAPPING SOURCES

CROSS-REFERENCE TO RELATED APPLICATIONS

The present application is claiming priority of U.S. Provisional Patent Application Ser. No. 62/135,982, filed on Mar. 20, 2015, the content of which is herein incorporated by reference.

BACKGROUND OF THE DISCLOSURE

1. Field of the Disclosure

The present disclosure concerns a data storage system, and more specifically, a system for aggregating high volumes of temporal data from multiple overlapping sources.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Database management systems and data warehouses utilize various implementations of Extract, Transform, Load (ETL) to integrate data from multiple systems. There are batch and parallel implementations of these techniques available and a wide body of academic and industry published papers and systems focused on this field. However, these systems do not solve the difficult operational scenario where data needs to be imported from multiple diverse sources, where the data within these sources can overlap, e.g., an instance of the same field for the same element in multiple sources, creating a requirement to choose the best source from the available sources, where all sources are not guaranteed to be available during every operational processing window, and the sequence of updates cannot be determined in advance. Furthermore, access to the aggregated updates should be fast and horizontally scalable irrespective of the amount of update data or amount of full universe data. Achieving service level agreements involving this amount of data by necessity requires a fully automated straight-through processing system with minimal, if any, manual intervention.

To illustrate the challenge: a business environment requires all updated data to be made available daily to clients. This is the operational processing window, e.g., 24 hours. A technical problem is presented because (a) these updates can come from multiple diverse source systems with the possibility that some data overlaps several sources, e.g., sales_data for company_a is included in source_1 and source_3 and sometimes source_4, and (b) during the operational window (multiple) updates from several sources may arrive for processing at different times, plus all sources may not be available during each operational window. A solution needs to provide a method of choosing which version of data, e.g., sales_data for company_a, should be used, regardless of whether all sources (1, 3 and 4) may be available, and regardless of the order those sources are made available. Furthermore, a system querying these updates should not experience query degradation regardless of the data volumes being processed. Query degradation relates to query speeds slowing down as the amount of data increases.

SUMMARY OF THE DISCLOSURE

There is provided a method and a system for aggregating high volumes of temporal data from multiple overlapping sources, ensuring the best source is used from all available sources within an operational processing window, where a sequence of updates cannot be determined in advance, and providing fast access to all aggregated updates.

The method includes (1) receiving a data element, (2) comparing the data element to a corresponding data element in a pend update history repository that contains changes that have occurred to the data element over time, thus yielding a comparison, (3) determining, based on the comparison, that the data element has changed, (4) checking that there is no update process running that might contain more up-to-date data for the data element, (5) relating the data element to a cutoff number that is associated with a particular range of time in a cutoff log, and (6) updating corresponding data elements in (a) a full universe data repository that stores a current value for the data element and a previous value for the data element, and (b) a delta data repository that stores a record that indicates (i) that the data element is being updated, and (ii) the cutoff number.

BRIEF DESCRIPTION OF THE DRAWINGS

FIG. 1A provides an example of some data in a file utilized by the system of FIG. 1.

FIG. 1B is an illustration of a table of an exemplary structure for storage of information in a cutoff log in the system of FIG. 1.

FIG. 2A is an illustration of a table of exemplary transformation rules utilized by the method of FIG. 2.

FIG. 3A is a table that shows an example of state machine logic, employed by the method of FIG. 2.

FIG. 3B is an illustration of a table that provides an example of updated data for the method of FIG. 2.

A component or a feature that is common to more than one drawing is indicated with the same reference number in each of the drawings.

DESCRIPTION OF THE DISCLOSURE

The present document discloses a method and a system for aggregating high volumes of temporal data from multiple overlapping sources, ensuring the best source is used from all available sources within an operational processing window, where a sequence of updates cannot be determined in advance, and providing fast access to all aggregated updates.

Figure 1:
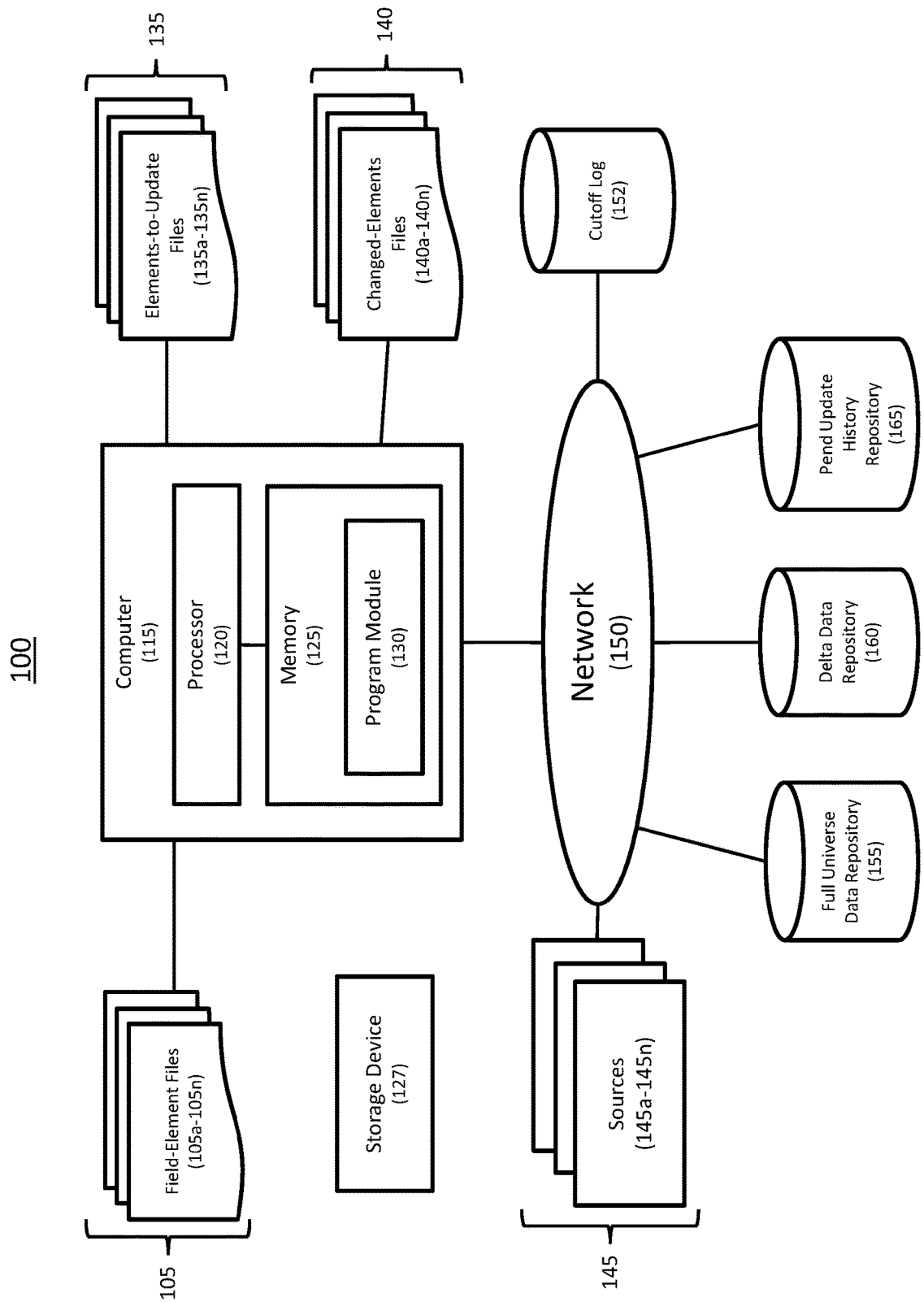
FIG. 1 is a block diagram of a system for aggregating high volumes of temporal data from multiple overlapping sources.

FIG. 1 is a block diagram of a system 100, for aggregating high volumes of temporal data from multiple overlapping sources. System 100 includes a computer 115, and data sources, i.e., sources 145, communicatively coupled to a network 150.

Sources 145 collectively refer to a plurality of sources 145a-145n, to indicate that sources 145 can include any number of sources.

Network 150 is a data communications network. Network 150 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, or (f) the Internet. Communications are conducted via network 150 by way of electronic signals and optical signals.

Computer 115 includes a processor 120, and a memory 125 coupled to processor 120. Although computer 115 is represented herein as a standalone device, it is not limited to such, but instead can be coupled to other devices (not shown) in a distributed processing system.

Processor 120 is an electronic device configured of logic circuitry that responds to and executes instructions.

Memory 125 is a tangible, non-transitory, computer-readable storage device encoded with a computer program. In this regard, memory 125 stores data and instructions, i.e., program code, that are readable and executable by processor 120 for controlling the operation of processor 120. Memory 125 may be implemented in a random access memory (RAM), a hard drive, a read only memory (ROM), or a combination thereof. One of the components of memory 125 is a program module 130.

Program module 130 contains instructions for controlling processor 120 to execute the methods described herein. The term "module" is used herein to denote a functional operation that may be embodied either as a stand-alone component or as an integrated configuration of a plurality of subordinate components. Thus, program module 130 may be implemented as a single module or as a plurality of modules that operate in cooperation with one another. In the present document, when we describe operations being performed by program module 130 or its subordinate modules, the operations are actually being performed by processor 120. Although program module 130 is described herein as being installed in memory 125, and therefore being implemented in software, it could be implemented in any of hardware (e.g., electronic circuitry), firmware, software, or a combination thereof.

While program module 130 is indicated as being already loaded into memory 125, it may be configured on a storage device 127 for subsequent loading into memory 125. Storage device 127 is a tangible, non-transitory, computer-readable storage device that stores program module 130 thereon. Examples of storage device 127 include a compact disk, a magnetic tape, a read only memory, an optical storage medium, a hard drive or a memory unit consisting of multiple parallel hard drives, and a universal serial bus (USB) flash drive. Alternatively, storage device 127 can be a random access memory, or other type of electronic storage device, located on a remote storage system and coupled to computer 115 via network 150.

Field-element files 105, elements-to-update files 135, and changed-elements files 140 are data items that are used as intermediary data stores in system 100, and are stored in memory 125. Field-element files 105 collectively refer to a plurality of field-element files 105a-105n, to indicate that field-element files 105 can include any number of field-element files. Elements-to-update files 135 collectively refer to a plurality of elements-to-update files 135a-135n, to indicate that elements-to-update files 135 can include any number of elements-to-update files. Changed-elements files 140 collectively refer to a plurality of changed-elements files 140a-140n, to indicate that changed-elements files 140 can include any number of changed-elements files. Field-element files 105, elements-to-update files 135, and changed-elements files 140 have the same structure as one another.

FIG. 1A provides an example of some data in a file in field-element files 105. The example shows a Data Universal Numbering System (DUNS) number for a business, and some business contact information associated therewith. There is no restriction on the type of data that can be stored.

System 100 includes several databases, namely a cutoff log 152, a full universe data repository 155, a delta data repository 160, and a pend update history repository 165.

Cutoff log 152 is a storage for cutoff numbers and related information. Each time a processing pipeline is executed, and changes are registered against the underlying data, all of the new dataset from that processing pipeline are stamped with a new sequential number, called a cutoff number. This number relates to all changes made at a particular time. Cutoff numbers are stored sequentially in cutoff log 152.

FIG. 1B is an illustration of a table, namely Table 190, of data in an exemplary structure for storage of information in cutoff log 152. This example shows four update periods identified by cutoff numbers 3, 4, 5 and 6. An update range start and an update range end are dates in the format yyyy-mm-dd_hh:mm:ss (i.e., year-month-day hour:minute:second).

Full universe data repository 155 is used to keep a complete master list of all elements, and their current value and previous value. Delta data repository 160 contains, for each update, a delta table that contains just the elements that were updated at a particular time. Pend update history repository 165 contains all changes that have occurred over time for each element.

Figure 1C:
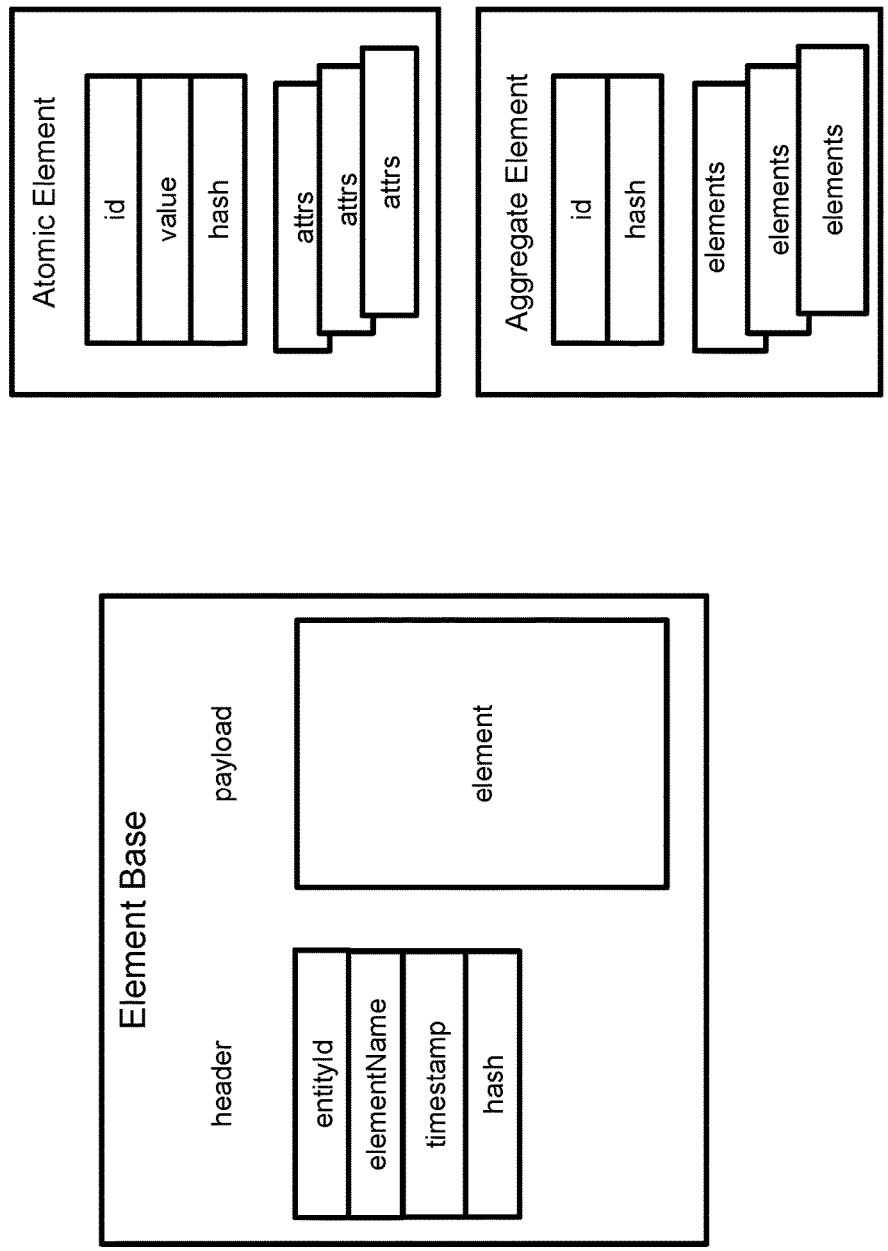
FIG. 1C is an illustration of a structure of a data model for repositories of the system of FIG. 1.

FIG. 1C is an illustration of a structure of a data model for full universe data repository 155, delta data repository 160, and pend update history repository 165. The features shown in FIG. 1C are as follows.
(a) An element base contains a header and a payload.
(b) The header contains a number of fields including:
    entityId: id referring to a unique entity, e.g., DUNS number;
    elementName: unique name for this element;
    timestamp: date and time of last update; and
    hash: unique value referring to this specific record to accelerate database lookup;
(b) The payload contains an element of type atomic or aggregate;
(d) Atomic elements have a precise and singular meaning and contain:
    id: unique id referring to this specific element;
    value: the actual value of the element;
    hash: unique value referring to this specific record to accelerate database lookup; and
    attrs: multiple attributes associated with this element, e.g., source of data, cutoff number; and
(e) Aggregate elements contain the result from combining multiple atomic elements, or calculated/derived values, and are structured with:
    id: unique id referring to this specific element;
    hash: unique value referring to this specific record to accelerate database lookup; and
    elements: a list of the elements that make up this aggregate element.

Figure 1D:
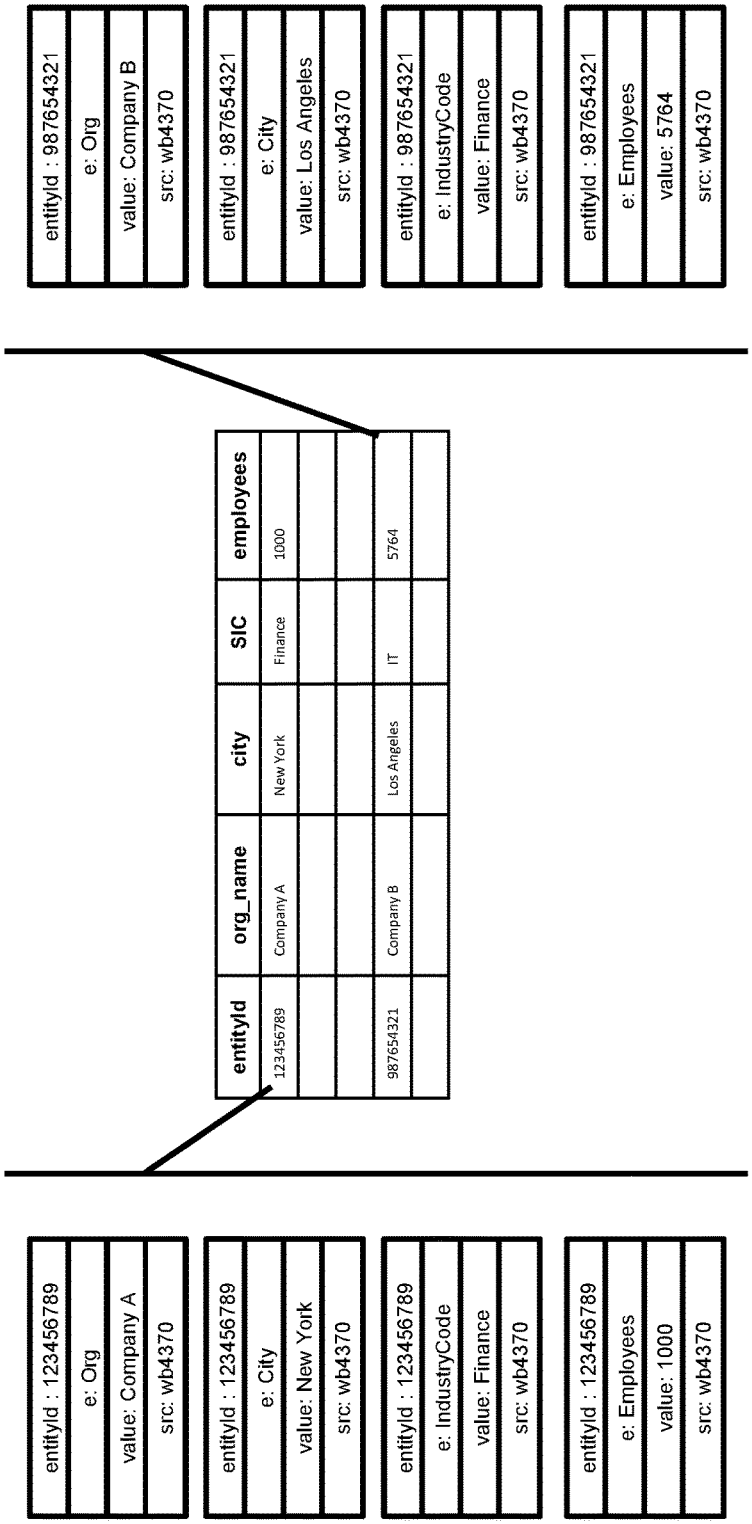
FIG. 1D is an example of some data as may be stored in repositories of the system of FIG. 1.

FIG. 1D is an illustration of an example of how data would be represented in full universe data repository 155, delta data repository 160, and pend update history repository 165. This example shows two partial records for entities (123456789 and 987654321). For each entity there are four elements illustrated on the left and right of FIG. 1D, covering Organization, City, Standard Industrial Classification (SIC), and number of employees. The center table shows how these elements would be combined into complete records for an entity.

Figure 2:
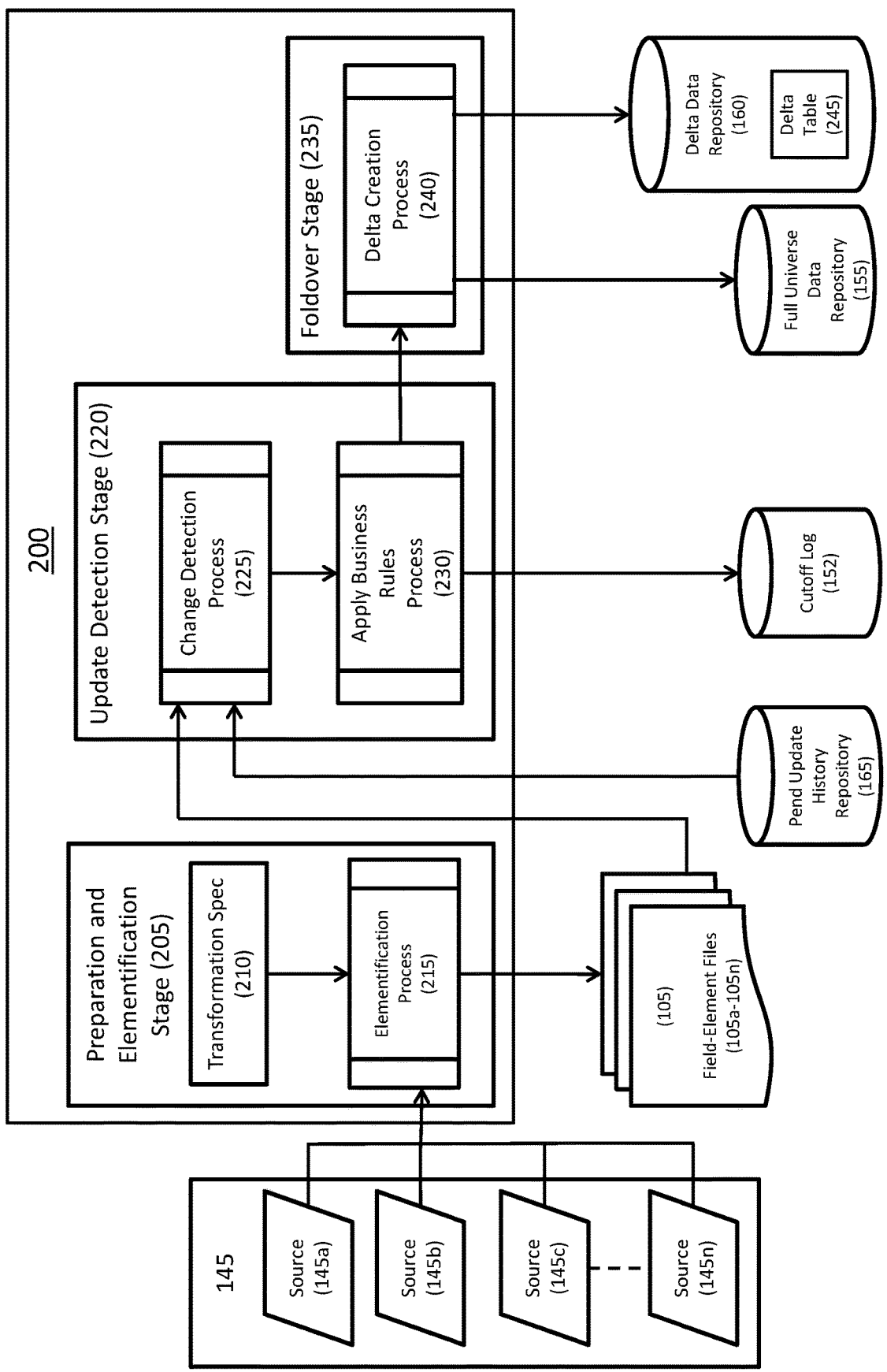
FIG. 2 is a functional block diagram of a method that is performed by a processor in the system of FIG. 1.

FIG. 2 is a functional block diagram of a method 200 that is performed by processor 120 in accordance with instructions in program module 130. In method 200, processor 120 aggregates high volumes of temporal data from sources 145 into data sets in full universe data repository 155 and delta data repository 160. Sources 145 include a source 145a, a source 145b, and a source 145c through a source 145n. Method 200 includes a preparation and elementification stage 205, an update detection stage 220, and a foldover stage 235.

In preparation and elementification stage 205, an elementification process 215 receives files from sources 145. Elementification process 215 converts files\fields (from sources 145) into data elements (see FIG. 1A). The files arrive from sources 145 in a sequence that cannot be pre-determined, and each file may contain fields, including overlapping fields, i.e., the same field in multiple files, required for the data sets in full universe data repository 155 and delta data repository 160.

Elementification process 215 receives files/fields from sources 145, and using a transformation specification (spec) 210, creates field-elements that are stored in field-element files 105. Elementification process 215 creates a corresponding one of field-element files 105 for each of sources 145. For example, elementification process 215 creates field-element file 105a for source 145a, field-element file 105b for source 145b, and so on. Elementification process 215 can process files from sources 145a, 145b, and 145c thru 145n either sequentially or in parallel.

There can be a one-to-one relationship, a one-to-many relationship, or a many-to-one relationship between fields in sources 145 and elements in field-element files 105.

In a one-to-one relationship, data fields included in sources 145 directly map to field-elements in field-element files 105. For example, fieldA from source 145a will directly map to fieldA in field-element file 105a.

In a one-to-many relationship, a single data field in sources 145 can be merged into multiple field-elements in field-element files 105. For example, fieldB from source 145a is merged into or used by fieldC, fieldD and fieldE in field-element file 105a.

In a many-to-one relationship, multiple fields in sources 145 can be merged into one field in field-element files 105. For example, fieldF, fieldG, fieldH from source 145a are merged into fieldJ in field-element file 105a.

These relationships are defined in transformation spec 210 along with rules and processes that describe a transformation to take place.

FIG. 2A is an illustration of a table, namely Table 290, of example transformation rules. In this example "IndustryCode[D&BIndustryCode][1]" is a one-to-many relationship mapping to fields GBWR_US_1987_SICS1, GBWR_US_1987_SICS1_DNB_IND_TYPE_CODE_ NORMALIZED, GBWR_US_1987_SICS1_DNB_IND_ TYPE_ TEXT_NORMALIZED, GBWR_US_1987_ SICS1_DNB_ IND_CODE_DESC_NORMALIZED, and EDGED&BSTANDARD, using values and attributes as described in the "mapping" column.

Referring again to FIG. 2, update detection stage 220 includes a change detection process 225 and an apply business rules process 230. Update detection stage 220 runs as part of a regular operational cycle, typically daily, but can be more often.

Change detection process 225 uses field-element files 105 for downstream mapping and comparison. Change detection process 225 detects all changed elements across all field-element files 105. These changes are aggregated, and change detection process 225 compares field-elements in field-element files 105 against a current value of those elements in pend update history repository 165.

Apply business rules process 230 applies business rules logic that decides which field-element values to actually update in full universe data repository 155 and delta data repository 160. As mentioned above, elementification process 215 can process files from sources 145a, 145b and 145c thru 145n either sequentially or in parallel. As such, processing of files from sources 145a, 145b, 145c, thru 145n by elementification process 215 can all begin at the same time. Apply business rules process 230 manages temporal integrity and will only release updates in sequence, even if elementification process 215 processed sources 145 in parallel. Also, depending on the contents and size of each file, some may be processed faster than others, and so, apply business rules process 230 performs a temporal integrity check to ensure updates are applied in the correct order.

Foldover stage 235 includes a delta creation process 240.

Delta creation process 240 enables fast lookup of high-volume aggregated data. A delta table, e.g., delta table 245, is created for each update in delta data repository 160, which contains just the entities that were updated at a particular time. In system 100, an individual business entity is uniquely identifiable by a unique identifier such as a DUNS number. Delta table 245 contains all elements of an entity, which for example, could be identified by a DUNS number, and which enables fast lookup of the element changes at a particular update time rather than forcing a full scan of full universe data repository 155.

Figure 3:
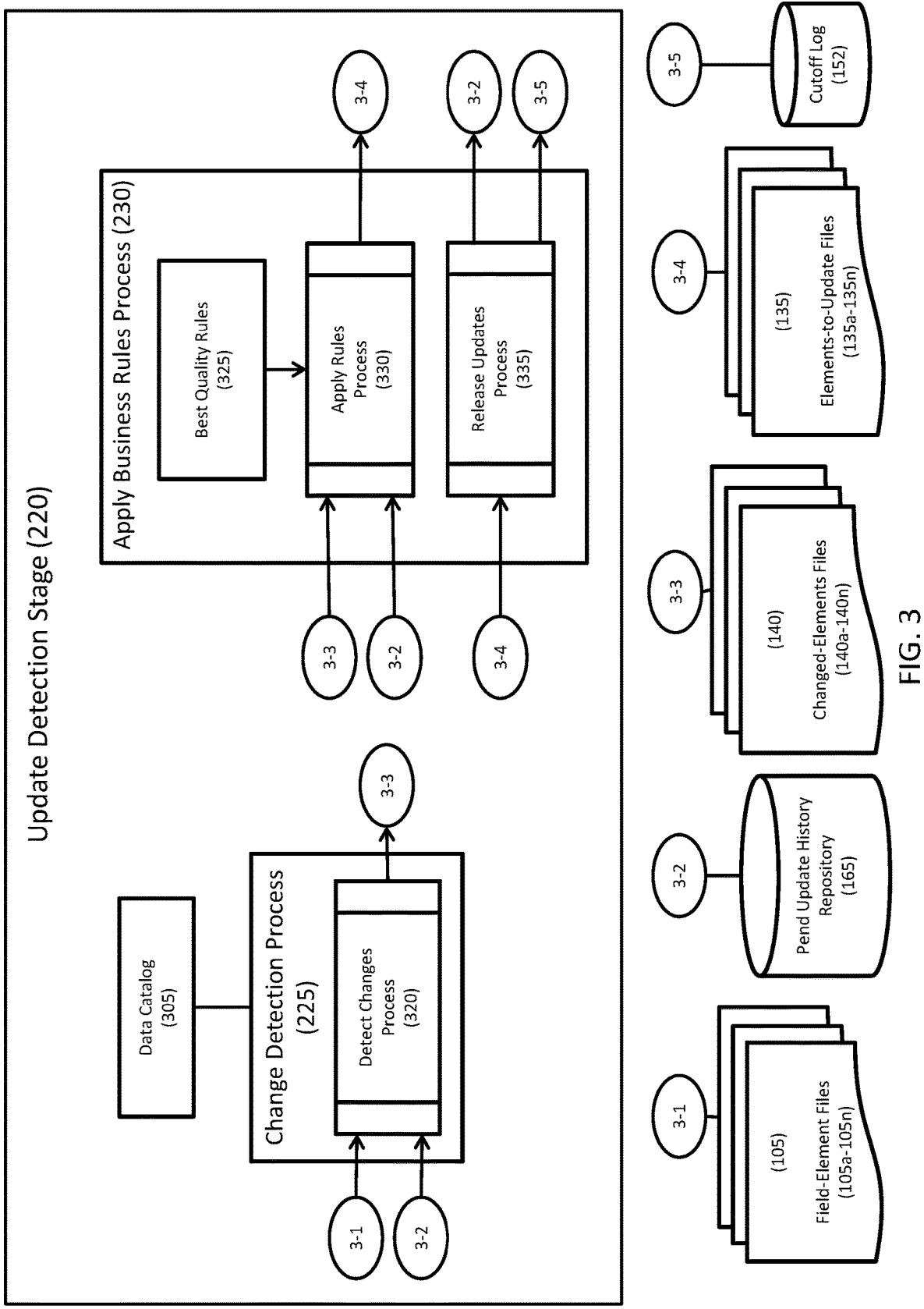
FIG. 3 is a functional block diagram of an update detection stage in the method of FIG. 2.

FIG. 3 is a functional block diagram of update detection stage 220. In FIG. 3, some lines are represented by way of connecting bubbles 3-1, 3-2, 3-3, 3-4 and 3-5. For example, connecting bubbles 3-1 represent a line, or a flow of data, from field-element files 105 to detect change process 320. As mentioned above, update detection stage 220 includes change detection process 225 and apply business rules process 230. As is also mentioned above, change detection process 225 detects all changed elements across all field-element files 105, aggregates the changes, and compares field-elements in field-element files 105 against the current value of those elements in pend update history repository 165. To perform these operations, change detection process 225 includes a detect changes process 320.

Detect changes process 320 receives field-element files 105, and accesses a data catalog 305.

Data catalog 305 contains an element id, an element description, and an element unique name. For example, element id of value "007" with an element description of "Unique Entity Identifier" and an element unique name of "EntityId".

As mentioned above, pend update history repository 165 contains all changes that have occurred over time for each element. Accordingly, detect changes process 320 determines whether elements in field-element files 105a-105n are different from the current value for those elements in pend update history repository 165. All elements that have actually changed are stored in changed-elements files 140a-140n. Only field-elements that have changed are pushed to apply business rules process 230.

As mentioned above, apply business rules process 230 applies business rules logic that decides which field-element values to actually update in full universe data repository 155 and delta data repository 160. To determine if the pend update history repository 165 needs to be updated, apply business rules process 230 applies logic that considers that updates can come from multiple sources where the sequence cannot be pre-determined. To perform these operations, apply business rules process 230 includes an apply rules process 330 and a release updates process 335.

Apply rules process 330 employs state machine logic to determine how updates are applied, irrespective of the order the updates are received. In this regard, apply rules process 330 utilizes best quality rules 325 to evaluate updates and determine state transitions, and thus determine how updates are applied.

FIG. 3A is an illustration of a table, namely Table 390, that shows an example of how state machine logic is applied to data coming from three different sources. Group A shows rules for elements coming from Source: S1 (145a), Group B shows rules for Source: S2 (145b), and Group C shows rules for Source: S3 (145c). These are illustrative examples only.

Best quality is a definition of which of sources 145a-145n contains the best data, and next best and so on, for an element. Elements have associated timestamps. Each best quality rule describes what change to make, if any, to an element based on the source of the element, whether the timestamp is newer, and whether the source for the element's current value is from a better quality source or not.

Best quality rules 325 do not require the values from two or more sources 145 to be present before an update decision can be made. The values to use depend not just on the update that has come in, but also on the current values in pend update history repository 165 and the source 145a-145n of the update. For example, the most recent element value in pend update history repository 165 may have come from source 145a (i.e., a prior source), and another update from source 145b (i.e., a present source) for the same element is subsequently detected. Apply rules process 330 utilizes best quality rules 325 to determine if pend update history repository 165 should be updated or not.

To ensure that temporal integrity is maintained, updates may be processed in sequence or in parallel by elementification process 215 and/or detect changes process 320, but they are released in sequence by release updates process 335.

Release updates process 335 monitors whether a newer update process is finished before an older update process, and if so, updated data is not released until the older process has finished, as both processes may apply changes to the same elements. Release updates process 335 stores updates in pend update history repository 165 with an updated cutoff number applied to each update. As mentioned above, a cutoff number is applied to each update and relates to all changes made at that particular time. Accordingly, release updates process 335 stores cutoff numbers sequentially in cutoff log 152.

FIG. 3B is an illustration of a table, namely Table 395, that provides an example of updated data. Table 395 shows an example of two updates to an element StreetAddressLine1. The value of this update is shown in the "value" attribute as "560 BROADWAY RM 510", having occurred at timestamp "2015-01-06T134454Z". Each update is also given a cutoff number to allow all change points to be tracked. In this case "cutoff" is set to "7" for this update. The source of the update is shown in the "source" attribute, and in this example, the source is "worldbase4370". A second update for this element is shown to have occurred at timestamp "2015-01-13T115914Z" and changes the element value to "560 BROADWAY RM 530". The "cutoff" value is set to "9". Cutoff log 152 stores the associated date and time ranges associated with each cutoff number, which allows all update points to be easily tracked.

Figure 4:
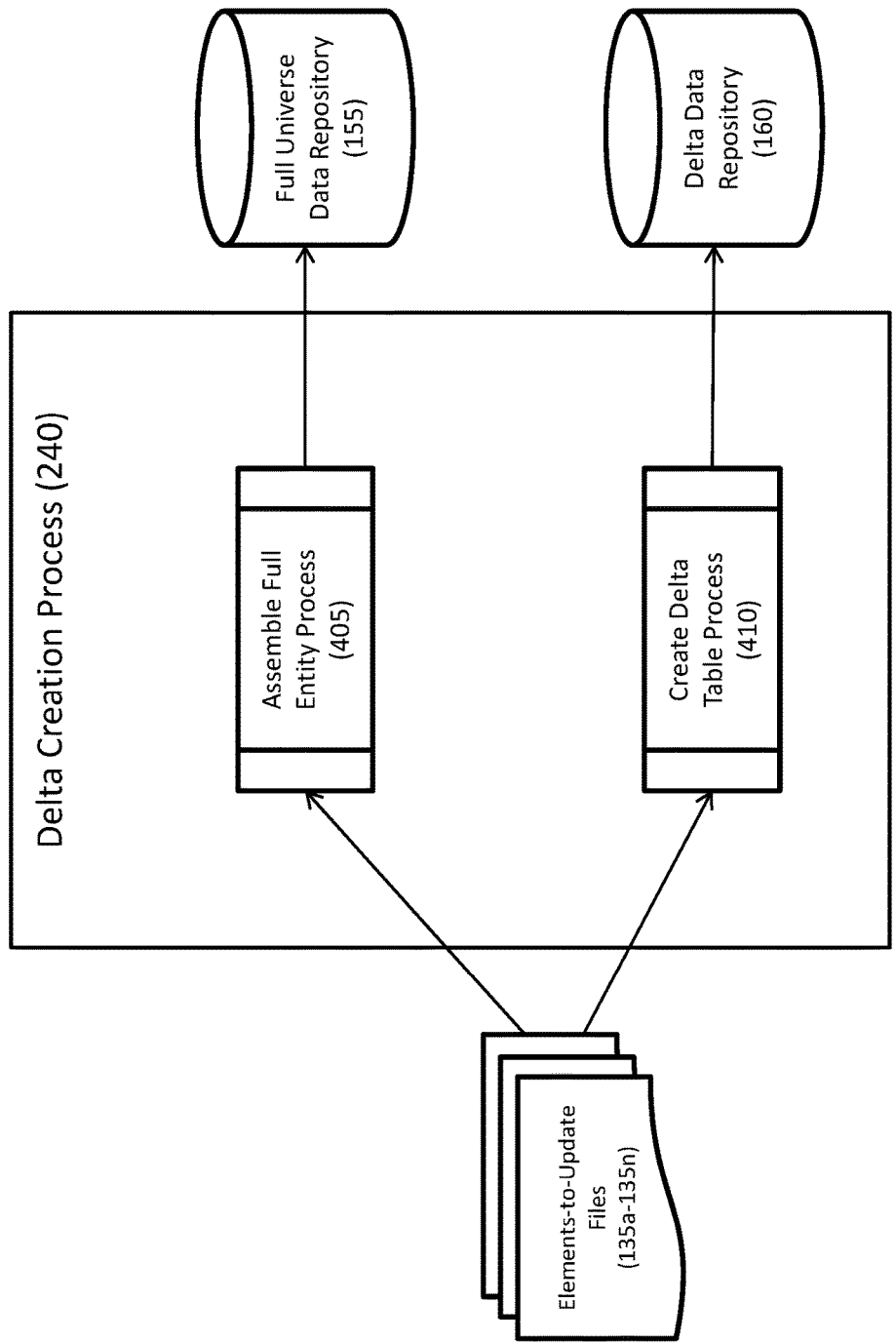
FIG. 4 is a functional block diagram of a delta creation process in the method of FIG. 2.

FIG. 4 is a functional block diagram of delta creation process 240, which, as mentioned above, enables fast lookup of high-volume aggregated data. Delta creation process 240 includes an assemble full entity process 405, and a create delta table process 410. Assemble full entity process 405 and create delta table process 410 are instantiated during a periodic operational update cycle.

As mentioned above, full universe data repository 155 is used to keep a complete master list of all elements, and their current value and previous value. Accordingly, assemble full entity process 405 reads elements-to-update files 135a-135n, writes the latest updates to full universe data repository 155, and removes the oldest updates from full universe data repository 155. Thus assemble full entity process 405 keeps only the most recent update and the previous update in full universe data repository 155.

Create delta table process 410 reads elements-to-update files 135a-135n, and writes them to delta data repository 160. For each change, create delta table process 410 creates, in delta data repository 160, a delta table that contains just the elements that were updated at that update time. A delta table contains all elements of an entity (DUNS). The values that have changed will have a cutoff number with the same name as the delta table. This enables fast lookup of an entity and its changes at a particular update time, thus ensuring that a full table scan of full universe data repository 155 is not necessary to determine changes.

Without delta tables, a system using the output of system 100 would need to scan full universe data repository 155 to determine if any changes were made. For systems with high-volumes of data, this scan would be very time consuming and would take more time as more data is added. Delta tables in delta data repository 160 store the updates made at a particular update time. Each delta table is marked with a corresponding cutoff number. Cutoff log 152 maintains a list of all update periods marked by a unique cutoff number. To determine the updates made within a particular time range, cutoff log 152 can be scanned to get a list of the relevant cutoff numbers. Using these cutoff numbers, the corresponding delta tables in delta data repository 160 can be scanned for all updates in the required time period.

Full universe data repository 155 and delta data repository 160, after being updated by delta creation process 240, are publish-ready.

Example

1) Assume that source 145a contains FieldA, and source 145b also contains FieldA.

2) Elementification process 215 uses transformation spec 210 to determine how to transform FieldA into an element. In this case, it is a one-to-one transformation into ElementA. Elementification process 215 creates field-element files 105a and 105b, and each contains ElementA.

3) Detect changes process 320 reads field-element files 105a and 105b, reads a current value for ElementA in pend update history repository 165, and uses data catalog 305 to determine if ElementA has changed. In this case ElementA has changed, and changed-elements files 140a and 140b are created containing ElementA.

4) Apply rules process 330 uses best quality rules 325 to determine which ElementA to use (from changed elements file 140a or from changed elements file 140b). In this case ElementA from changed elements file 140b is used. Elements-to-update file 135*b* is written with the value of ElementA from changed elements file 140*b*.

5) Release updates process 335 checks temporal integrity to make sure no relevant update processes are still running which might contain more up-to-date data. In this example there are no running processes, therefore the update for ElementA from elements-to-update file 135*b* is released and written to pend update history repository 165. A new cutoff record for the current update period is added to cutoff log 152 with a sequentially assigned cutoff number.

6) Assemble full entity process 405 applies the update for ElementA from elements-to-update file 135*b* to full universe data repository 155 and also keeps the previous value for ElementA. Create delta table process 410 applies the update for ElementA into a new delta table (named with a new cutoff number) in delta data repository 160, applying the new cutoff number to the updated details for ElementA (see FIG. 3B).

System 100 provides for aggregating high volumes of temporal data from multiple overlapping sources, ensuring the best source is used from all available sources within an operational processing window, where a sequence of updates cannot be determined in advance, and providing fast access to all aggregated updates. System 100 achieves this by applying updates within an operational processing window, e.g., 24 hours. The operational processing window forces an update to occur irrespective of whether system 100 is waiting for updates from some sources 145. These updates can come from multiple diverse sources 145 with the possibility that some data overlaps several sources 145, e.g., sales_data for company_a is included in source 145*a* and source 145*b* and sometimes source 145*c*. During the operational window (multiple) updates from several sources 145 may arrive for processing at different times, plus all sources 145 may not be available during each operational window. System 100 utilizes update detection stage 220 to choose which version of, for example, sales_data for company_a should be used, regardless of whether or not all sources 145*a*, 145*b* and 145*c* may be available, and regardless of the order sources 145*a*, 145*b* and 145*c* are made available. Furthermore, a system querying the output of system 100 will not experience query degradation, regardless of the data volumes being processed. System 100 utilizes delta tables in delta data repository 160 containing just the updates at each update point thus ensuring full universe data repository 155 does not need to be scanned when looking for a list of updates.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method of aggregating data from multiple sources in a computer network, said method comprising:
receiving a data element from a source among said multiple sources;
comparing said data element to a corresponding current data element in a pend update history repository that contains changes that have occurred to said data element over time, thus yielding a comparison;
determining, based on said comparison, that said data element has changed, thus yielding first updated data for said data element from said source, wherein said first updated data has a first timestamp;
executing a first update process that includes:
 (A) monitoring whether a second update process is running having second updated data for said data element, wherein said second updated data has a second timestamp that is earlier than said first timestamp;
 (B) holding said first updated data until said second update process has finished; and
 (C) releasing said first updated data and performing operations of:
  (1) obtaining a cutoff number that identifies a particular range of time; and
  (2) updating fields for said data element, based on said first updated data, in (a) a full universe data repository that stores (i) said first updated data for said data element, and (ii) a previous value for said data element, and (b) a delta data repository that stores (i) said first updated data for said data element, and (ii) said cutoff number;
performing said receiving, said comparing, said determining and said executing for other data elements from other sources among said multiple sources; and
accessing said delta data repository, and utilizing said cutoff number to determine that an update for said data element was made within said particular range of time.

2. The method of claim 1,
wherein said method also includes:
determining, in accordance with rules that consider said source, whether to update said data element.

3. The method of claim 2,
wherein said source is a first source,
wherein said pend update history repository holds a current value for said data element from a second source, and
wherein said rules also consider said second source.

4. The method of claim 3,
wherein other values for said data element are available from a plurality of sources, and
wherein said rules consider said plurality of sources.

5. A system for aggregating data from multiple sources in a computer network, said system comprising:
a processor; and
a memory that contains instructions that are readable by said processor to cause said processor to:
receive a data element from a source among said multiple sources;
compare said data element to a corresponding current data element in a pend update history repository that contains changes that have occurred to said data element over time, thus yielding a comparison;
determine, based on said comparison, that said data element has changed, thus yielding first updated data for said data element from said source, wherein said first updated data has a first timestamp;
execute a first update process that includes operations to:

(A) monitor whether a second update process is running having second updated data for said data element, wherein said second updated data has a second timestamp that is earlier than said first timestamp;
(B) hold said first updated data until said second update process has finished; and
(C) release said first updated data and perform operations to:
  (1) obtain a cutoff number that identifies a particular range of time; and
  (2) update fields for said data element, based on said first updated data, in (a) a full universe data repository that stores (i) said first updated data for said data element, and (ii) a previous value for said data element, and (b) a delta data repository that stores (i) said first updated data for said data element, and (ii) said cutoff number;
perform said receive, said compare, said determine and said execute for other data elements from other sources among said multiple sources; and
access said delta data repository, and utilize said cutoff number to determine that an update for said data element was made within said particular range of time.

6. The system of claim 5,
wherein said instructions also cause said processor to:
  determine, in accordance with rules that consider said source, whether to update said data element.

7. The system of claim 6,
wherein said source is a first source,
wherein said pend update history repository holds a current value for said data element from a second source, and
wherein said rules also consider said second source.

8. The system of claim 7,
wherein other values for said data element are available from a plurality of sources, and
wherein said rules consider said plurality of sources.

9. A storage device that is non-transitory, comprising instructions that are readable by a processor to perform a method of aggregating data from multiple sources in a computer network, by causing said processor to:
receive a data element from a source among said multiple sources;
compare said data element to a corresponding current data element in a pend update history repository that contains changes that have occurred to said data element over time, thus yielding a comparison;
determine, based on said comparison, that said data element has changed, thus yielding first updated data for said data element from said source, wherein said first updated data has a first timestamp;
execute a first update process that includes operations to:
  (A) monitor whether a second update process is running having second updated data for said data element, wherein said second updated data has a second timestamp that is earlier than said first timestamp;
  (B) hold said first updated data until said second update process has finished; and
  (C) release said first updated data and perform operations to:
    (1) obtain a cutoff number that identifies a particular range of time; and
    (2) update fields for said data element, based on said first updated data, in (a) a full universe data repository that stores (i) said first updated data for said data element, and (ii) a previous value for said data element, and (b) a delta data repository that stores (i) said updated data for said data element, and (ii) said cutoff number; and
access said delta data repository, and utilize said cutoff number to determine that an update for said data element was made within said particular range of time.

10. The storage device of claim 9,
wherein said instructions also cause said processor to:
  determine, in accordance with rules that consider said source, whether to update said data element.

11. The storage device of claim 10,
wherein said source is a first source,
wherein said pend update history repository holds a current value for said data element from a second source, and
wherein said rules also consider said second source.

12. The storage device of claim 11,
wherein other values for said data element are available from a plurality of sources, and wherein said rules consider said plurality of sources.

* * * * *